(12) United States Patent
Kubota et al.

(10) Patent No.: US 8,372,530 B2
(45) Date of Patent: Feb. 12, 2013

(54) VEHICULAR POWER SUPPLY SYSTEM (75) Inventors: Shinya Kubota, Wako (JP); Masao Kawata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 405 days.

(21) Appl. No.: 12/743,705

(22) PCT Filed: Nov. 18, 2008

(86) PCT No.: PCT/JP2008/070943
§ 371 (c)(1),
(2), (4) Date: May 19, 2010

(87) PCT Pub. No.: WO2009/066661
PCT Pub. Date: May 28, 2009

(65) Prior Publication Data
US 2010/0273040 A1 Oct. 28, 2010

(30) Foreign Application Priority Data

Nov. 21, 2007 (JP) .................................. 2007-302276
Sep. 1, 2008 (JP) .................................. 2008-223878

(51) Int. Cl.
*H01M 2/10* (2006.01)
*H01M 2/00* (2006.01)
*H01M 2/08* (2006.01)
*B60K 1/00* (2006.01)
(52) U.S. Cl. ........ 429/100; 429/163; 429/185; 429/186; 180/65.1
(58) Field of Classification Search ................... 429/96, 429/99, 100, 156, 163, 185, 186; 180/65.1, 180/65.21
See application file for complete search history.

(56) References Cited

U.S. PATENT DOCUMENTS

| | | | |
|---|---|---|---|
| 5,620,057 A | 4/1997 | Klemen et al. | |
| 7,396,075 B2 * | 7/2008 | Ohkuma et al. | ........... 297/180.1 |

FOREIGN PATENT DOCUMENTS

| | | |
|---|---|---|
| CN | 1899883 A | 1/2007 |
| EP | 1 454 797 A1 | 9/2004 |
| EP | 1 745 977 A1 | 1/2007 |
| JP | 9-118252 A | 5/1997 |
| JP | 11-1184 A | 1/1999 |
| JP | 2005-324771 A | 11/2005 |
| JP | 2006-335244 A | 12/2006 |
| JP | 2007-22350 A | 2/2007 |
| TW | 200735445 A | 9/2007 |

* cited by examiner

*Primary Examiner* — Carlos Barcena
(74) *Attorney, Agent, or Firm* — Arent Fox LLP (57) ABSTRACT In a vehicular power supply system, inclined portions (16c) extending obliquely upward toward the exterior from two mutually opposing side edges of a waterproof case (14) are formed on a hanger frame (16), and an upper face opening (14b) of the waterproof case (14) and an outer peripheral part of a lid member (15) are equipped with extended portions (14a, 15a) extending upward so as to cover the inclined portion (16c) of the hanger frame (16). This enables water flowing on an upper face of the lid member (15) or water that has accumulated on the upper face of the lid member (15) to be blocked by the extended portions (14a, 15a) and to be prevented from entering the interior of the waterproof case (14) via an outer peripheral face of the hanger frame (16) running through mating faces of a lid member (15) and the waterproof case (14) housing a battery module (24) and a high voltage electrical component (33).

9 Claims, 10 Drawing Sheets

VEHICULAR POWER SUPPLY SYSTEM

CROSS-REFERENCED TO RELATED APPLICATION

This application is a National Stage entry of International Application No. PCT/JP2008/070943, filed on Nov. 18, 2008, which claims priority to Japanese Patent Application No. 2007-302276, filed Nov. 11, 2007 and Japanese Patent Application No. 2008-223878, filed Sep. 1, 2008, the disclosure of the prior applications are incorporated in its entirety by reference.

TECHNICAL FIELD

The present invention relates to a vehicular power supply system that includes a waterproof case housing at least a battery or a high voltage electrical component, a lid member covering an upper face opening of the waterproof case, and a hanger frame having a longitudinally intermediate section held between the upper face opening of the waterproof case and an outer peripheral part of the lid member in order to hangingly support the waterproof case.

BACKGROUND ART

An arrangement in which a power supply unit housing a battery module and a motor control system in the interior of an upper case and lower case is disposed beneath a floor of an automobile trunk compartment, and the power supply unit is hangingly supported on a vehicle body frame via two, that is, front and rear, battery support frames running through mating faces of the upper case and lower case in the vehicle width direction is known from Patent Publication 1 below.
[Patent Publication 1] Japanese Patent Application Laid-open No. 2007-22350

DISCLOSURE OF INVENTION

Problems to be Solved by the Invention

In the above-mentioned conventional arrangement, there is a possibility that when water is spilled over the floor of the trunk compartment, the water will flow across an upper face of the upper case of the power supply unit and flow into the lower case through a gap between the upper case and lower case and the battery support frame, thus making the battery module or the motor control system wet.

The present invention has been accomplished in the light of the above-mentioned circumstances, and it is an object thereof to prevent water from entering the interior of a waterproof case via an outer peripheral face of a hanger frame running through mating faces of a lid member and the waterproof case, the waterproof case housing a battery module and a high voltage electrical component.

Means for Solving the Problems

In order to attain the above object, according to a first aspect of the present invention, there is provided a vehicular power supply system comprising: a waterproof case housing at least a battery module or an electrical component; a lid member covering an upper face opening of the waterproof case; and a hanger frame having a longitudinally intermediate section held between the upper face opening of the waterproof case and an outer peripheral part of the lid member in order to hangingly support the waterproof case, characterized in that inclined portions extending obliquely upward or obliquely downward toward the exterior from two mutually opposing side edges of the waterproof case are formed on the hanger frame, and the upper face opening of the waterproof case and the outer peripheral part of the lid member are equipped with an extended portion extending obliquely upward or obliquely downward along the hanger frame so as to cover the inclined portion of the hanger frame.

According to a second aspect of the present invention, in addition to the first aspect, the extended portions of the waterproof case and the lid member are inclined obliquely upward toward the exterior, and the height of the lower end of the opening of each of the extended portion is higher than the height of the upper face of the lid member.

According to a third aspect of the present invention, in addition to the first or second aspect, a seal member is disposed between the inclined portion of the hanger frame and the extended portions of the waterproof case and the lid member.

According to a fourth aspect of the present invention, in addition to any one of the first to third aspects, an outer peripheral part of the lid member is equipped with an outside flange bent downwardly in a section other than the extended portion, and the lower end of the outside flange is positioned lower than the upper face opening of the waterproof case.

According to a fifth aspect of the present invention, in addition to the fourth aspect, the upper face opening of the waterproof case is equipped with an inside flange bent downwardly in a section other than the extended portion, and the lower end of the outside flange is positioned lower than the lower end of the inside flange.

According to a sixth aspect of the present invention, in addition to the fifth aspect, the lower end of the outside flange is equipped with a bent portion bent toward the waterproof case side.

According to a seventh aspect of the present invention, in addition to any one of the first to sixth aspects, the lid member is inclined in a direction perpendicular to the orientation of the hanger frame, and a protruding portion is formed along a side on the higher side of the lid member.

According to an eighth aspect of the present invention, in addition to the seventh aspect, the waterproof case is disposed in a vehicle body rear part, the upper face of the lid member is inclined so that the vehicle body rear side is lower, and the outside flange, on the vehicle body rear side, of the lid member extends to the vicinity of a lower end part of the waterproof case.

According to a ninth aspect of the present invention, in addition to any one of the first to sixth aspects, the upper face of the lid member includes a flat portion receiving water, a plurality of bead portions protruding upwardly from the flat portion, and a protruding portion that, among outer peripheral edges of the lid member, is along the outer peripheral edge on one end side, and a discharge route for discharging water received by the flat portion is arranged by forming an outlet, which communicates with a space provided between the waterproof case and a floor panel, in at least part of the outer peripheral edge, other than a section where the protruding portion of the lid member, in the flat portion is formed.

A tire pan 11 of an embodiment corresponds to the floor panel of the present invention, and a side outside flange 15b and a rear outside flange 15d of the embodiment correspond to the outside flange of the present invention.

Effects of the Invention

In accordance with the arrangement of claim 1, the upper face opening of the waterproof case housing the battery module and the electrical component is covered by the lid member is hangingly supported by the hanger frame held between the upper face opening of the waterproof case and the outer peripheral part of the lid member. The inclined portion, which extends obliquely upward or obliquely downward toward the exterior from the two mutually opposing side edges of the waterproof case, is formed on the hanger frame, and when an extended portion extending obliquely upward so as to cover the inclined portion of the hanger frame is provided on the upper face opening of the waterproof case and the outer peripheral part of the lid member, it is possible to prevent water that is flowing on an upper face of the lid member or water that has accumulated on the upper face of the lid member from moving toward the hanger frame side via the extended portion extending obliquely upward, thus preventing the water from entering the interior of the waterproof case. Furthermore, when an extended portion extending obliquely downward is provided, by allowing water to flow down along the extended portion extending obliquely downward, water can be prevented from entering the interior of the waterproof case and, moreover, it is possible to prevent water running along the outer peripheral part of the hanger frame from entering the interior of the waterproof case.

Furthermore, in accordance with the arrangement of claim 2, since the extended portion of the waterproof case is inclined obliquely upward toward the exterior, and the height of the lower end of the opening of the extended portion is higher than the height of the upper face of the lid member, it is possible to prevent water that has run down from the hanger frame from traveling around to the side part of the extended portion and entering via the opening of the extended portion.

Moreover, in accordance with the arrangement of claim 3, since the seal member is disposed between the inclined portion of the hanger frame and the extended portions of the waterproof case and lid member, it is possible by means of the seal member to block water that has crossed the hanger frame and flowed toward the waterproof case side and prevent it from entering the waterproof case.

Furthermore, in accordance with the arrangement of claim 4, since the portion, other than the extended portion, of the outer peripheral part of the lid member is bent downward so as to form the outside flange, and the lower end of the outside flange is positioned below the upper face opening of the waterproof case, not only is it possible to prevent water from entering the interior of the waterproof case by blocking by means of the outside flange water splashed from the outside, but it is also possible to prevent water from entering the interior of the waterproof case by forming an air layer between an outer face of the waterproof case and an inner face of the outside flange.

Moreover, in accordance with the arrangement of claim 5, since the inside flange is formed by bending downward the portion, other than the extended portion, of the upper face opening of the waterproof case, it is possible by means of the inside flange to block effectively water that is attempting to enter upwardly along the outer face of the waterproof case.

Furthermore, in accordance with the arrangement of claim 6, providing the lower end of the outside flange with the bent portion, which is bent toward the waterproof case side, enables water that is attempting to enter from below to be blocked by means of the bent portion, thus further enhancing the water resistance of the waterproof case.

Moreover, in accordance with the arrangement of claim 7, since the lid member is inclined in the direction perpendicular to the orientation of the hanger frame, and the protruding portion is formed along the higher side of the lid member, water that has spilled over an upper face of the lid member does not flow in the direction in which the hanger frame is oriented but flows from the protruding portion, which is present at the higher position, toward the lower side, and it is possible to yet more reliably prevent water from entering the interior of the waterproof case from the extended portions of the waterproof case and lid member.

Furthermore, in accordance with the arrangement of claim 8, since the lid member of the waterproof case disposed in the vehicle body rear part is inclined so that the vehicle body rear side thereof is lower, water that has spilled over the upper face of the lid member flows to the rear of the vehicle body and falls, but since the outside flange, on the vehicle body rear side, of the lid member extends to the vicinity of a lower end part of the waterproof case, it is possible to yet more reliably prevent water that has fallen from the upper face of the lid member from entering the interior of the waterproof case. Moreover, when the subject vehicle has a rear-end collision from behind, since the outside flange is disposed between the vehicle colliding with the rear and the waterproof case, it is possible to alleviate the damage to the waterproof case.

Moreover, in accordance with the arrangement of claim 9, since the upper face of the lid member is equipped with the flat portion and the plurality of bead portions protruding upwardly from the flat portion, and the flat portion forms at least part of the outer peripheral edge of the lid member, not only can the battery module and the electrical component be protected by the improved strength of the lid member, but it is also possible to discharge effectively water that has accumulated on the flat portion held between the protruding bead portions via the outlet of the outer peripheral edge of the lid member to the space provided between the waterproof case and the floor panel.

EXPLANATION OF REFERENCE NUMERALS
AND SYMBOLS

11 Tire pan (floor panel)
14 Waterproof case
14a Extended portion
14b Upper face opening
14c Inside flange
15 Lid member 15a Extended portion
15b Side part outside flange (outside flange)
15c Protruding portion
15d Rear part outside flange (outside flange)
15e Bent portion
15f Flat portion
15g Bead portion
15i Outlet
16 Hanger frame
16c Inclined portion
24 Battery module
33 High voltage electrical component (electrical component)
44 Seal member
49 Space

BEST MODE FOR CARRYING OUT THE INVENTION

Embodiments of the present invention are explained below by reference to the attached drawings.

First Embodiment

FIG. 1 to FIG. 8 show a first embodiment of the present invention.

Figure 1:
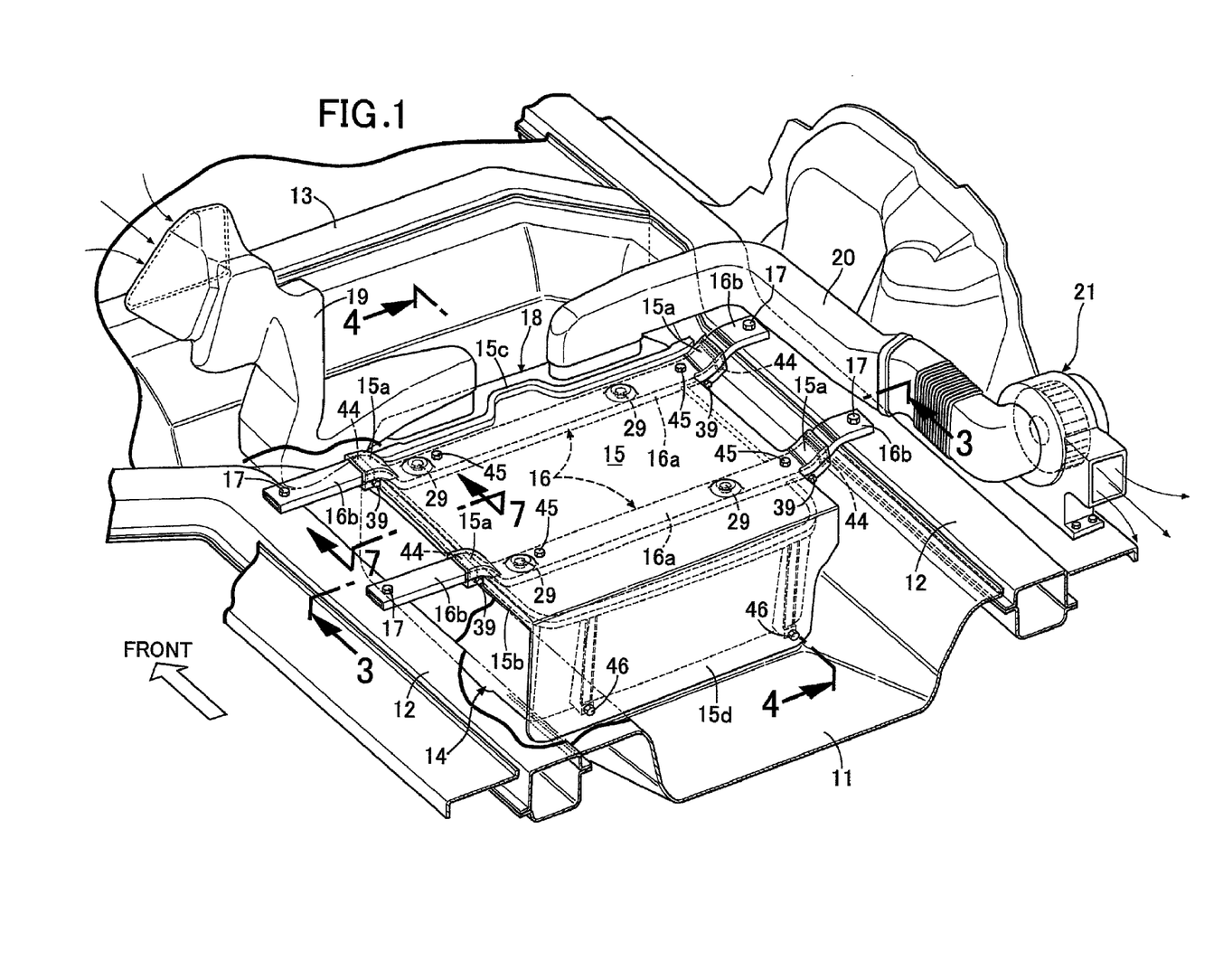
FIG. 1 is an overall perspective view of a vehicular power supply system. (first embodiment)

As shown in FIG. 1, a power supply system for operating a motor/generator of a hybrid vehicle is housed by utilizing a tire pan 11 that houses a spare tire beneath a trunk compartment of a vehicle body rear part. The tire pan 11, which has a downwardly recessed container shape, has its left and right side edges connected to left and right rear side frames 12 and 12, and has its front edge connected to a cross member 13 bridging the left and right rear side frames 12 and 12 in a vehicle width direction. The power supply system includes a waterproof case 14 having a container shape with an open upper face, and a flat plate-shaped lid member 15 closing the upper face opening, and opposite end parts in the vehicle width direction of a pair of front and rear hanger frames 16 and 16 extending in the vehicle width direction while being held between the waterproof case 14 and the lid member 15 are fixed to upper faces of the left and right rear side frames 12 and 12 by bolts 17. The power supply system is therefore hangingly supported by the left and right rear side frames 12 and 12 via the pair of front and rear hanger frames 16 and 16.

The front edge of the lid member 15 ends at the position of the front hanger frame 16, and a duct member 18 is housed within the waterproof case 14 in front of the position. The duct member 18 includes an intake duct 19 taking in air within a vehicle compartment into the waterproof case 14 as cooling air, and an exhaust duct 20 discharging cooling air that has finished cooling from the interior of the waterproof case 15, the intake duct 19 extending to the upper front left of the vehicle body from a front left part of the waterproof case 14, and the exhaust duct 20 extending rearwardly from a front right part of the waterproof case 14 along the right side face of the vehicle body. The rear end of the exhaust duct 20 is provided with an electrically operated fan 21, and cooling air is taken into the intake duct 19 by means of negative pressure generated by the fan 21. Cooling air discharged from the intake duct 19 is discharged between an interior material of the trunk compartment and a rear fender, part thereof is returned to the interior of the vehicle compartment, and part thereof is discharged outside the vehicle.

Figure 2:
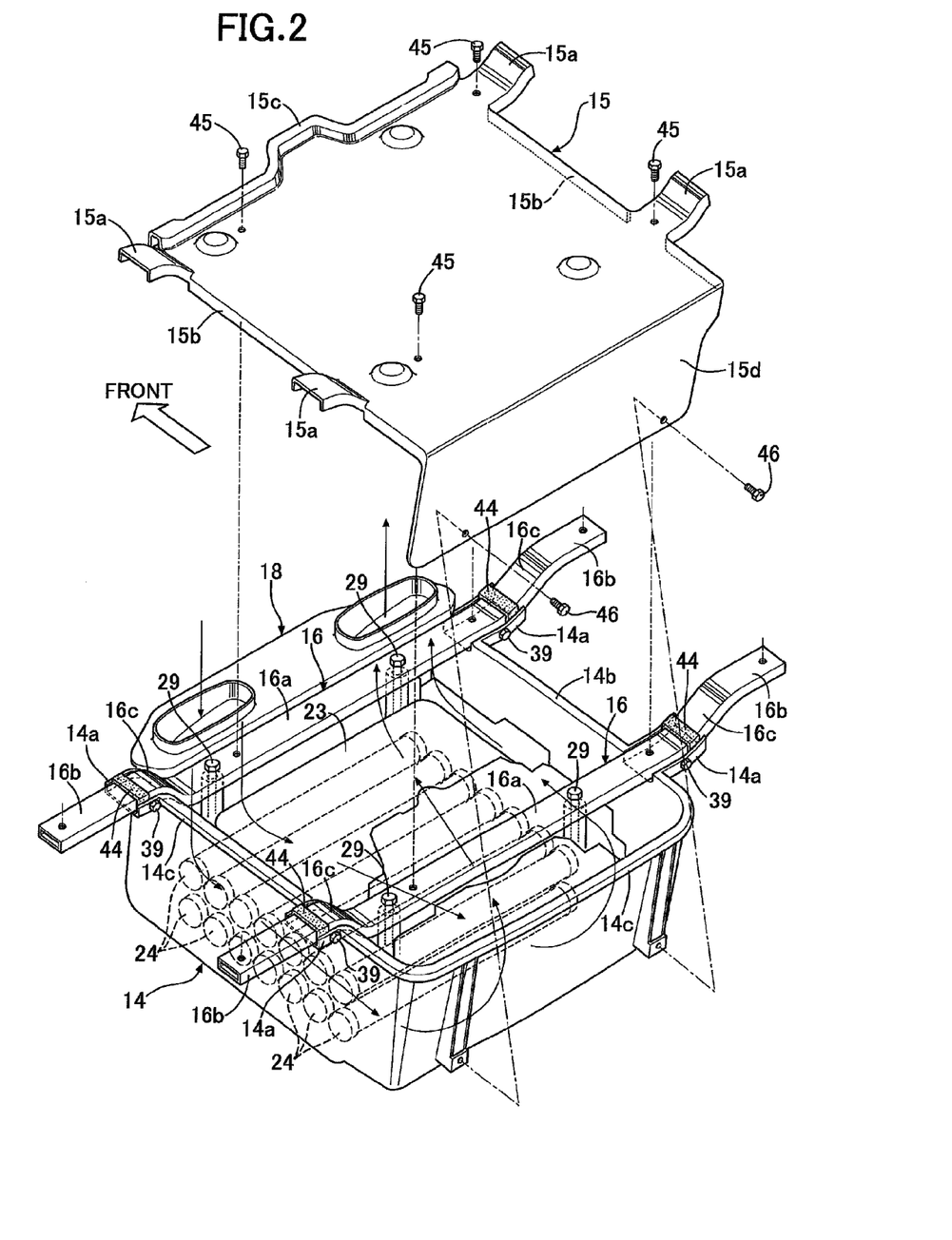
FIG. 2 is a partially exploded perspective view of the vehicular power supply system. (first embodiment)
Figure 3:
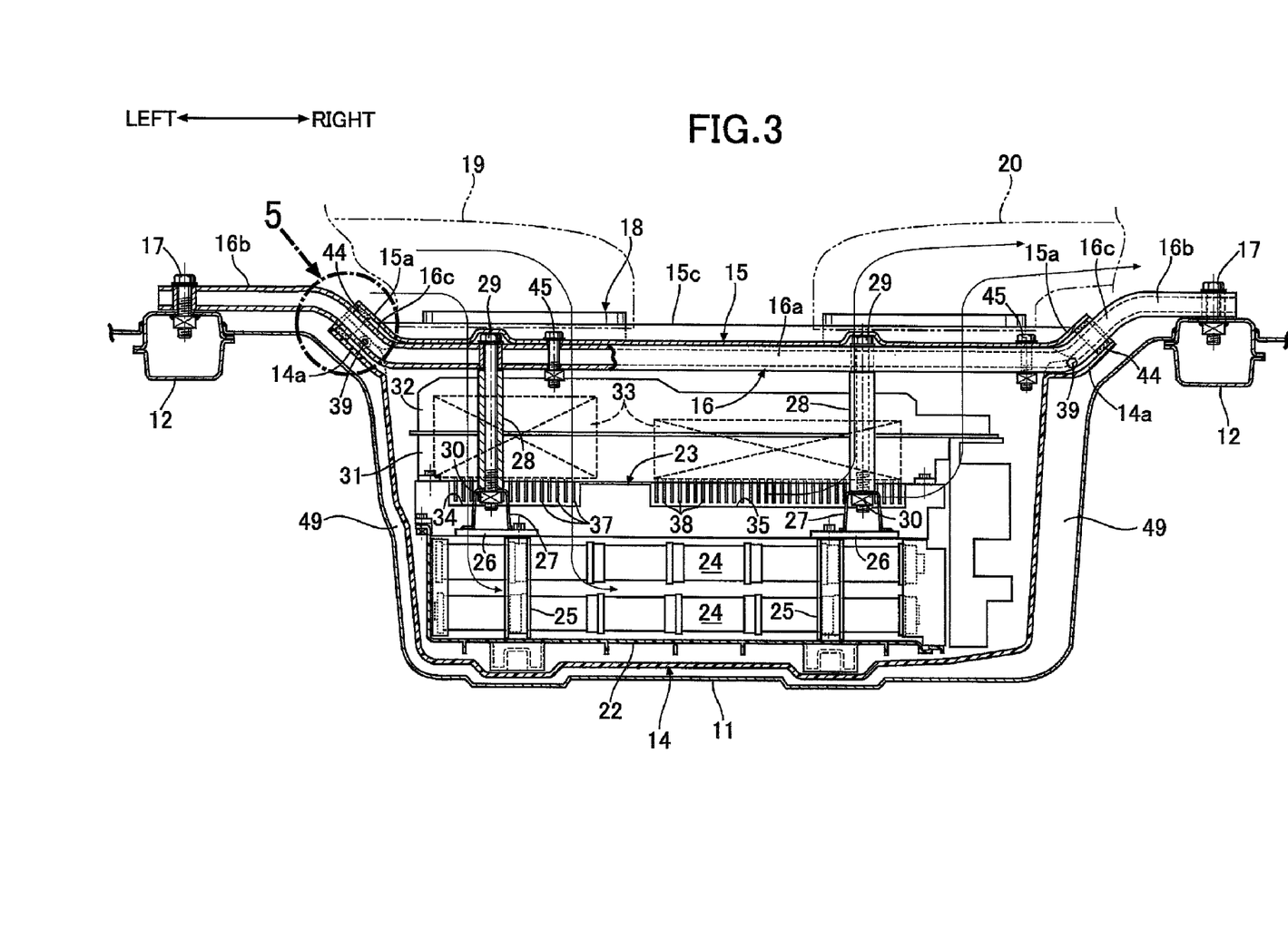
FIG. 3 is a sectional view along line 3-3 in FIG. 1. (first embodiment)
Figure 4:
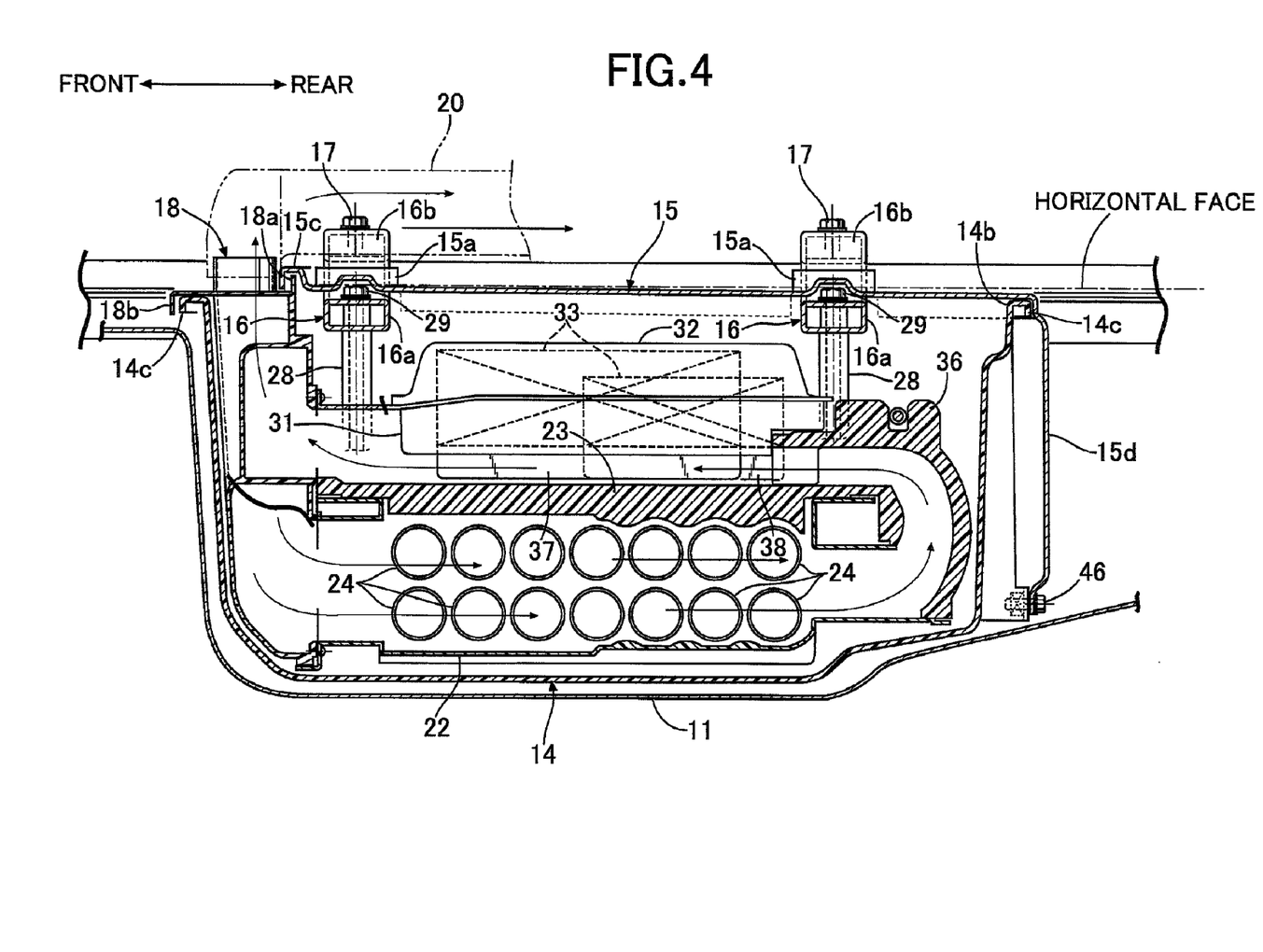
FIG. 4 is a sectional view along line 4-4 in FIG. 1. (first embodiment)

As shown in FIG. 2 to FIG. 4, a lower battery case 22 and an upper battery case 23 forming a passage for cooling air are disposed in a bottom part of the waterproof case 14 so that a space is formed therebetween. Rod-shaped battery modules 24 in which a plurality of battery cells are connected in series in the vehicle width direction are arranged so that there are 7 rows in the fore-and-aft direction and two layers in the vertical direction, and housed in the interiors of the lower battery case 22 and the upper battery case 23 in a state in which they are bundled by a pair of left and right U-shaped lower battery support frames 25 and 25 and a pair of left and right I-shaped upper battery support frames 26 and 26 joined to upper ends thereof.

A pair of left and right brackets 27 and 27 provided on upper faces of the upper battery support frames 26 are connected to the hanger frames 16 by long bolts 29 and 29 having collars 28 and 28 fitted around the outer periphery and nuts 30 and 30 screwed around lower ends thereof. A total of 14 battery modules 24 are therefore hangingly supported on the front and rear hanger frames 16 by the four bolts 29.

A lower electrical component case 31 and an upper electrical component case 32 are fixed to an upper face of the upper battery case 23, and high voltage electrical components 33 such as an inverter and a DC-DC converter are housed in the interior thereof. Cooling air passages 34 and 35 are formed between the upper face of the upper battery case 23 and a lower face of the lower electrical component case 31, and in order to guide cooling air that has cooled the battery modules 24 to the cooling air passages 34 and 35 an air guide member 36 is provided on an upper face of a rear part of the upper battery case 23. Heat sinks 37 and 38 extending downwardly from the high voltage electrical components 33 face the cooling air passages 34 and 35.

As is clear from FIG. 2 to FIG. 6, each of the hanger frames 16 includes a first horizontal portion 16a in the middle, second horizontal portions 16b and 16b at opposite ends, and inclined portions 16c and 16c that are inclined so that the outer side in the vehicle width direction is higher while connecting the first horizontal portion 16a to the second horizontal portions 16b and 16b, and the hanger frame 16 extends to the exterior of the waterproof case 14 via the inclined portions 16c and 16c.

Figure 5:
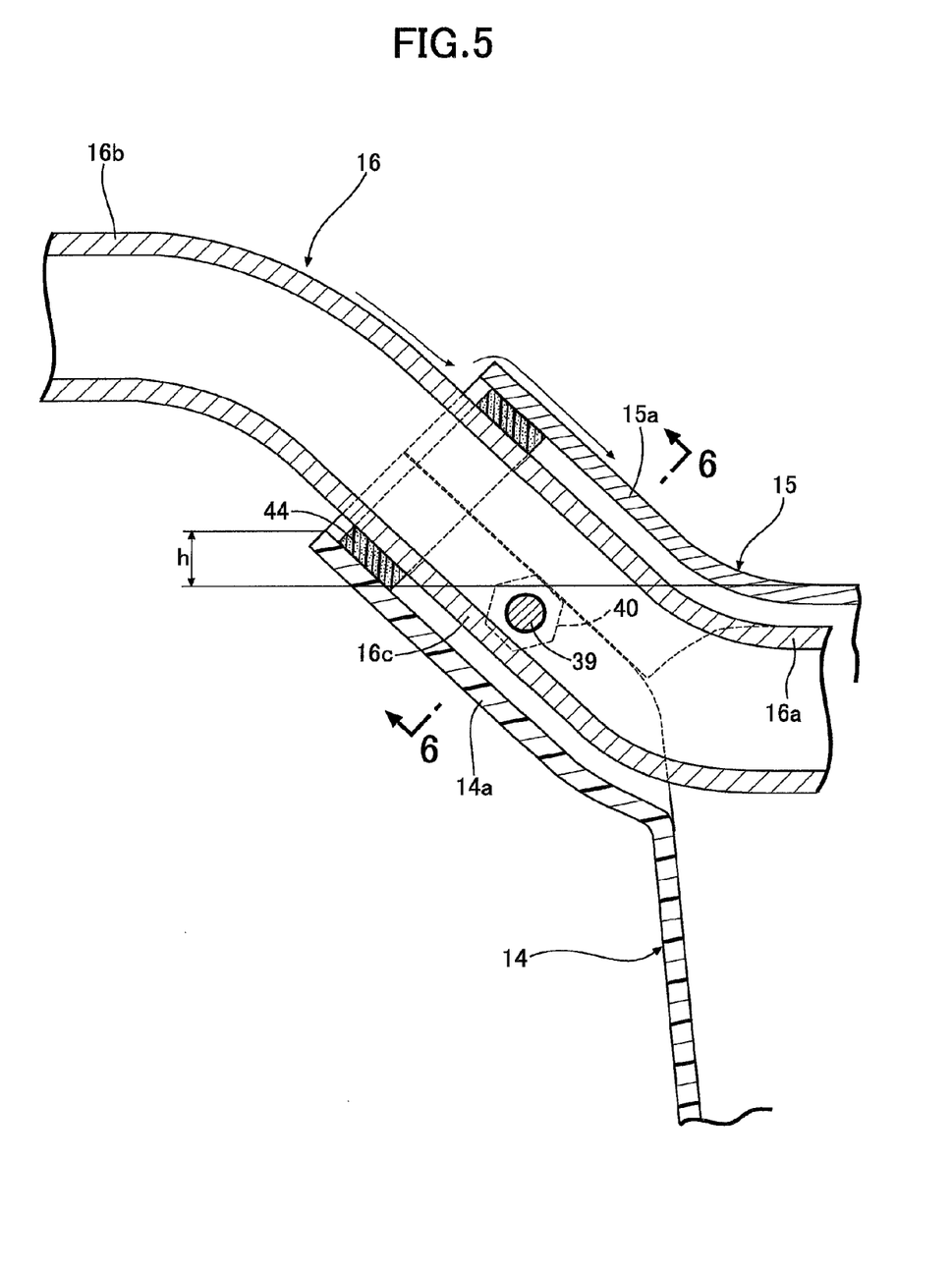
FIG. 5 is an enlarged view of part 5 in FIG. 3. (first embodiment)
Figure 6:
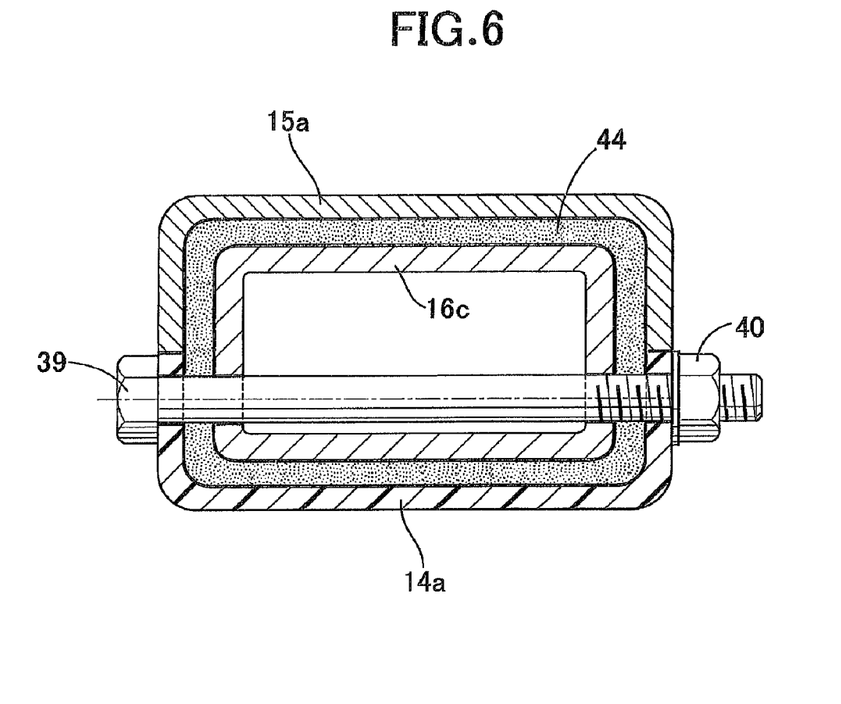
FIG. 6 is a sectional view along line 6-6 in FIG. 5. (first embodiment)

The waterproof case 14 includes an extended portion 14a, which has a squared U-shaped cross-section, in a portion where the inclined portion 16c of the hanger frame 16 extends to the exterior, the extended portion 14a being inclined obliquely upward along the inclined portion 16c of the hanger frame 16, and the extended portion 14a is fixed to the inclined portion 16c of the hanger frame 16 by means of a bolt 39 and a nut 40 (see FIG. 5 and FIG. 6). At a position corresponding to the extended portion 14a of the waterproof case 14, an extended portion 15a, which has a squared U-shaped cross section, is also formed on the lid member 15, and the two extended portions 14a and 15a in cooperation cover the outer periphery of the inclined portion 16c, which has a rectangular cross-section. A sealing function can be exhibited by sandwiching a seal member 44, which is made of a synthetic resin foam, between the extended portion 14a of the waterproof case 14, which has the squared U-shaped cross section, and the extended portion 15a of the lid member 15, which has the squared U-shaped cross section, the seal member 44 being fitted onto the outer periphery of each of the inclined portions 16c of each of the hanger frames 16.

As is clear from FIG. 1 to FIG. 3, the lid member 15 is fixed to the upper faces of the front and rear hanger frames 16 and 16 by means of four bolts 45, and in this state an outer peripheral part of the lid member 15 is in intimate contact with the upper face opening 14b of the waterproof case 14.

Figure 7:
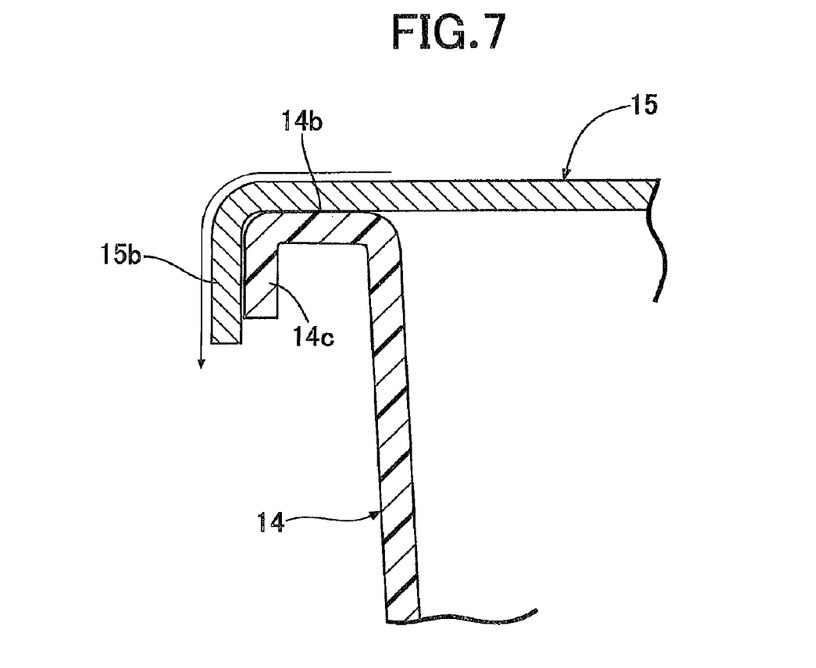
FIG. 7 is an enlarged sectional view along line 7-7 in FIG. 1. (first embodiment)

As is clear from FIG. 7, the upper face opening 14b of the waterproof case 14 includes a downwardly bent inside flange 14c, and opposite left and right side edges of the lid member 15 covering the upper face opening 14b include a downwardly bent side part outside flange 15b. The lower end of the side part outside flange 15b of the lid member 15 extends lower than the lower end of the inside flange 14c of the waterproof case 14.

As is clear from FIG. 1 and FIG. 4, a rib 18a spanning the entire region in the vehicle width direction projects upwardly at the rear end of the upper face of the duct member 18, and a protruding portion 15c formed on the front edge of the lid member 15 so as to open downwardly in a squared U-shape is fitted onto the rib 18a so as to cover it from above. Furthermore, the upper face of the lid member 15 is slightly inclined so that the front is higher and the rear is lower, and a rear part outside flange 15d formed by bending the rear end of the lid member 15 downward extends to the vicinity of the lower end of the waterproof case 14 and is there fixed to the waterproof case 14 by means of two bolts 46 and 46. Moreover, a downwardly bent outside flange 18b is formed at the forwardly projecting front end of the upper face of the duct member 18, and the lower end thereof extends lower than the lower end of the inside flange 14c at the front edge of the waterproof case 14.

The operation of the embodiment of the present invention having the above-mentioned arrangement is now explained.

When the motor/generator of the hybrid vehicle is driven, the battery modules 24 and the high voltage electrical component 33 such as an inverter or a DC-DC converter generate heat. When the fan 21 is driven, due to negative pressure generated on the upstream side thereof air within the vehicle compartment is taken into the duct member 18 via the intake duct 19 as cooling air. The cooling air flows out to the rear via the lower part of the duct member 18, cools the battery modules 24 while flowing to the rear in the space between the lower battery case 22 and the upper battery case 23, subsequently makes a U-turn upward, and flows through the cooling air passages 34 and 35 from the rear to the front; during this process it comes into contact with the heat sinks 37 and 38 projecting into the cooling air passages 34 and 35, thus cooling the high voltage electrical components 33. Cooling air that has completed cooling in this way flows into the exhaust duct 20 via the upper part of the duct member 18, goes past the fan 21, and then branches to the interior of the vehicle compartment and the exterior of the vehicle compartment and is discharged.

When water is spilled within the trunk compartment, if the water enters the interior of the waterproof case 14 it will affect the battery modules 24 or the high voltage electrical components 33, and therefore it is necessary to reliably prevent water from entering the interior of the waterproof case 14.

First, a route with the highest possibility of water entering is the route in which water that has dropped onto the upper face of the lid member 15 enters the interior of the waterproof case 14 via the mating faces of the waterproof case 14 and the lid member 15, and since the extended portions 14a and 15a, which cover the inclined portions 16c of the hanger frames 16, rise obliquely upward relative to the upper face of the lid member 15, there is almost no possibility of water entering the interior of the waterproof case 14 via the extremity of the extended portions 14a and 15a. Furthermore, even if water flows down along the inclined portion 16c from the second horizontal portion 16b on the outer side in the vehicle width direction of the hanger frame 16, the water is blocked by the seal member 44 and is prevented from entering the interior of the waterproof case 14.

Figure 8:
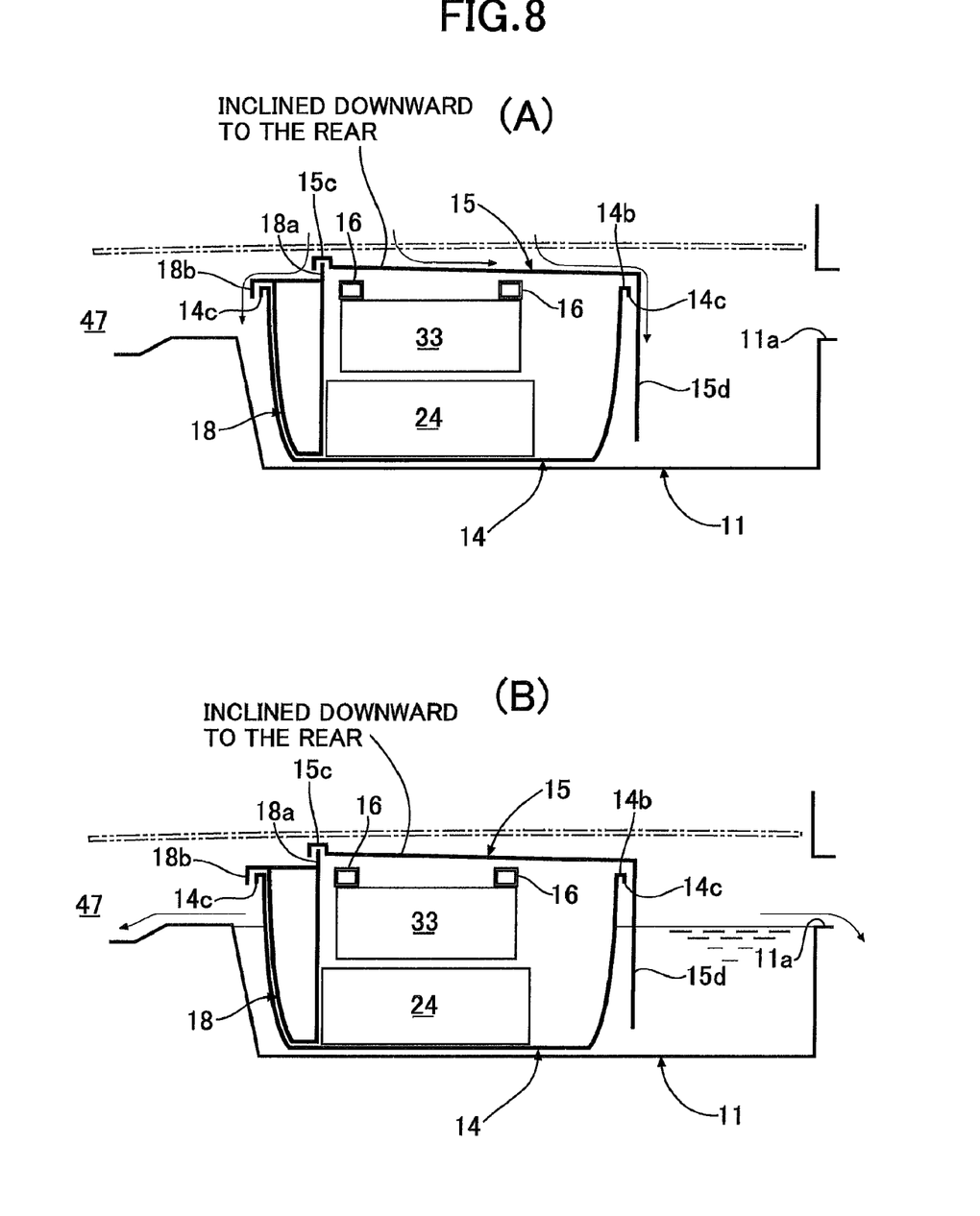
FIG. 8 is a diagram for explaining the operation of a waterproof case and a lid member. (first embodiment)

Water that has dripped onto the upper face of the duct member 18 is blocked by a labyrinth structure (see FIG. 4) formed from the rib 18a at the rear end and the protruding portion 15c at the front end of the lid member 15, and is prevented from entering the interior of the waterproof case 14 (see FIG. 8 (A)). Furthermore, by providing the protruding portion 15c water can be prevented from entering toward the duct member 18 side. Moreover, since the lid member 15 is inclined so that it gradually becomes lower in going from the front to the rear, the majority of the water that has dripped onto the upper face of the lid member 15 flows to the rear of the vehicle body and is guided downward along the rear part outside flange 15d hanging down from the rear edge of the lid member 15. Since this rear part outside flange 15d extends to the vicinity of the lower end of the waterproof case 14 beyond the lower end of the inside flange 14c of the waterproof case 14, there is no possibility of water entering via the upper face opening 14b of the waterproof case 14 (see FIG. 8 (A)). Moreover, when the vehicle has a rear-end collision, since the rear part outside flange 15d of the lid member 15 functions as a protecting wall, the waterproof case 14 can be protected.

Furthermore, water that has dropped onto the upper face of the duct member 18 flows forward and falls down across the outside flange 18b, and since the lower end of the outside flange 18b extends lower than the lower end of the inside flange 14c of the waterproof case 14, there is no possibility of water entering the interior of the waterproof case 14 (see FIG. 8 (A)).

Moreover, water that has flowed outward in the vehicle width direction on the upper face of the lid member 15 drips down across the side part outside flange 15b, but since the side part outside flange 15b extends lower than the lower end of the inside flange 14c of the waterproof case 14, there is no possibility of water that has separated from the lower end of the side part outside flange 15b entering the interior of the waterproof case 14 (see FIG. 7). Furthermore, since the height of the upper face of the lid member 15 is lower by a distance h than the lower end of the opening of the extended portions 14a and 15a of the waterproof case 14 and the lid member 15 (see FIG. 5), of water that has flowed toward the lid member 15 side across from the hanger frame 16 due to, for example, condensation, water that travels around to the side parts of the extended portions 14a and 15a can be prevented from flowing into the opening of the extended portions 14a and 15a.

Even when a large amount of water has accumulated in the interior of the tire pan 11, water does not enter the interior of the waterproof case 14, which has a container shape with only its upper face open, and water thus accumulated is discharged rearward through an opening 11a of the tire pan 11, the opening 11a being provided at a position lower than the upper face opening 14b of the waterproof case 14, or is discharged to the vehicle compartment 47 side (see FIG. 8 (B)).

Second Embodiment

Figure 9:
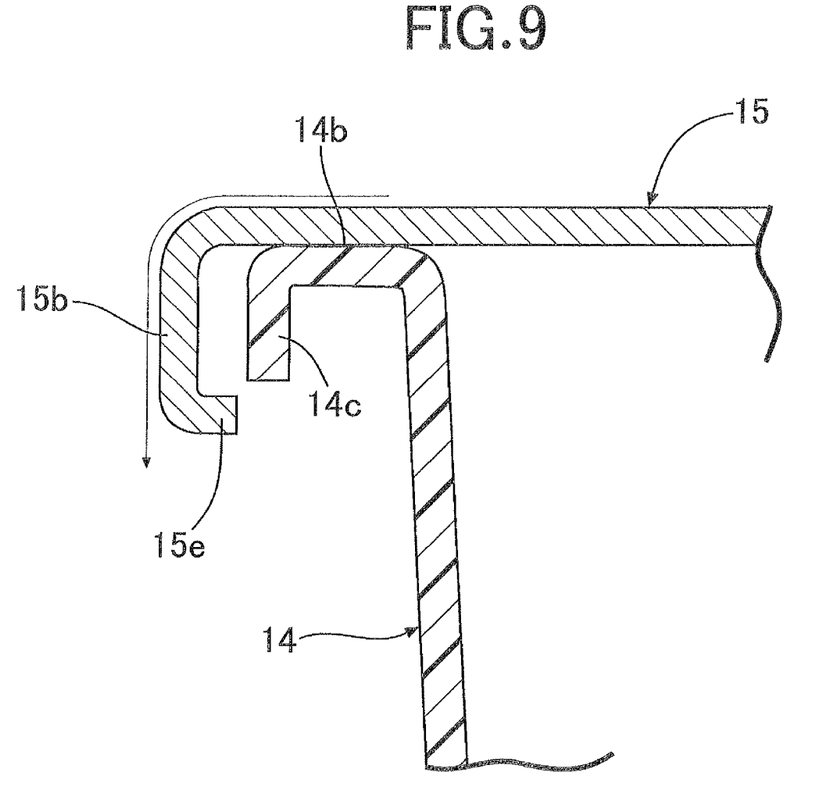
FIG. 9 is a view, corresponding to FIG. 7, related to a second embodiment. (second embodiment)

A second embodiment of the present invention is now explained by reference to FIG. 9.

In the first embodiment, the lower end of the side part outside flange 15b of the lid member 15 extends downward, but in the second embodiment a bent portion 15e, which is inwardly bent, is formed at the lower end of a side part outside flange 15b. This bent portion 15e blocks water splashed from below, thus still more reliably preventing the entrance of water into a waterproof case 14.

Third Embodiment

Figure 10:
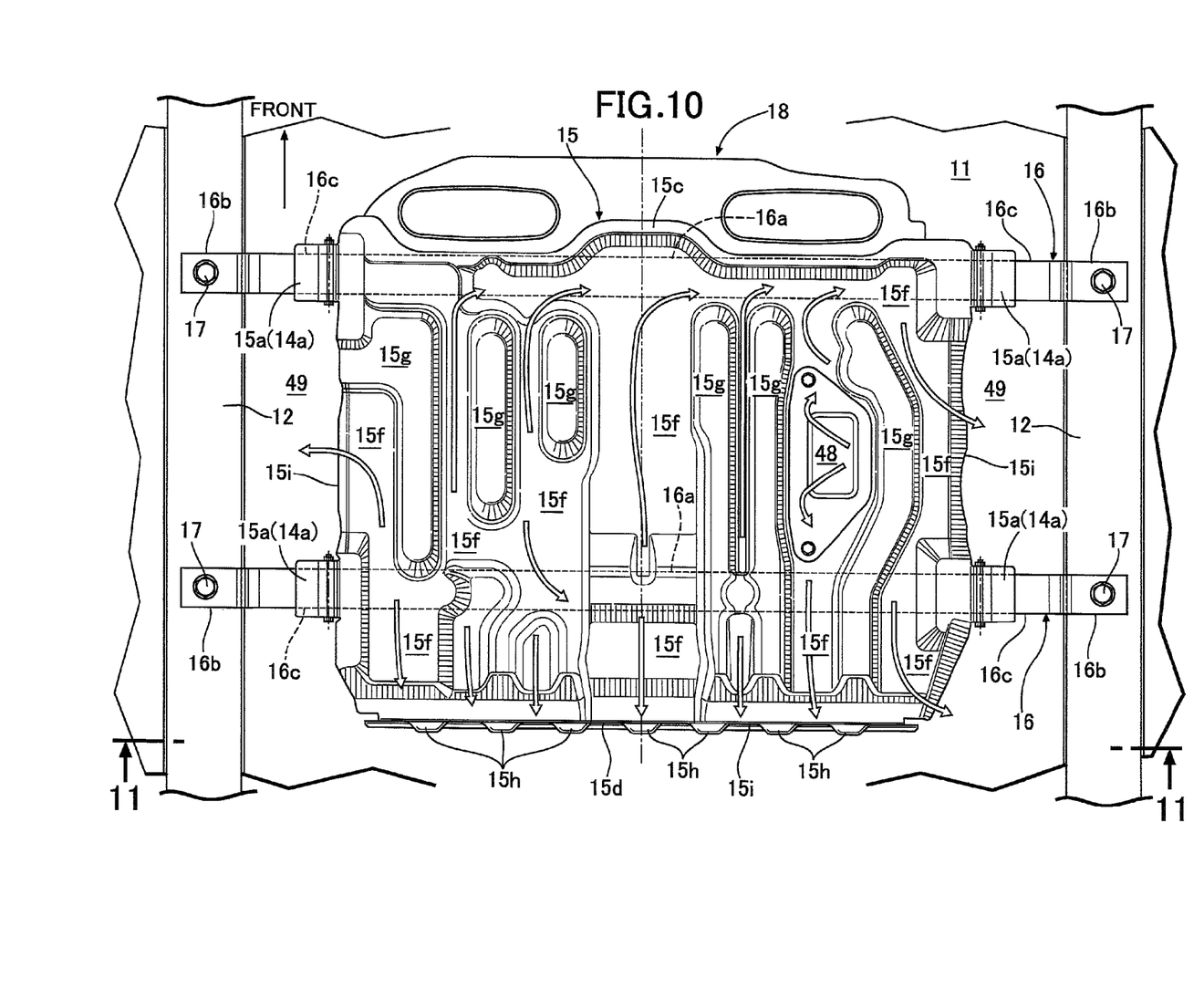
FIG. 10 is a plan view of a waterproof case and a lid member, related to a third embodiment. (third embodiment)
Figure 11:
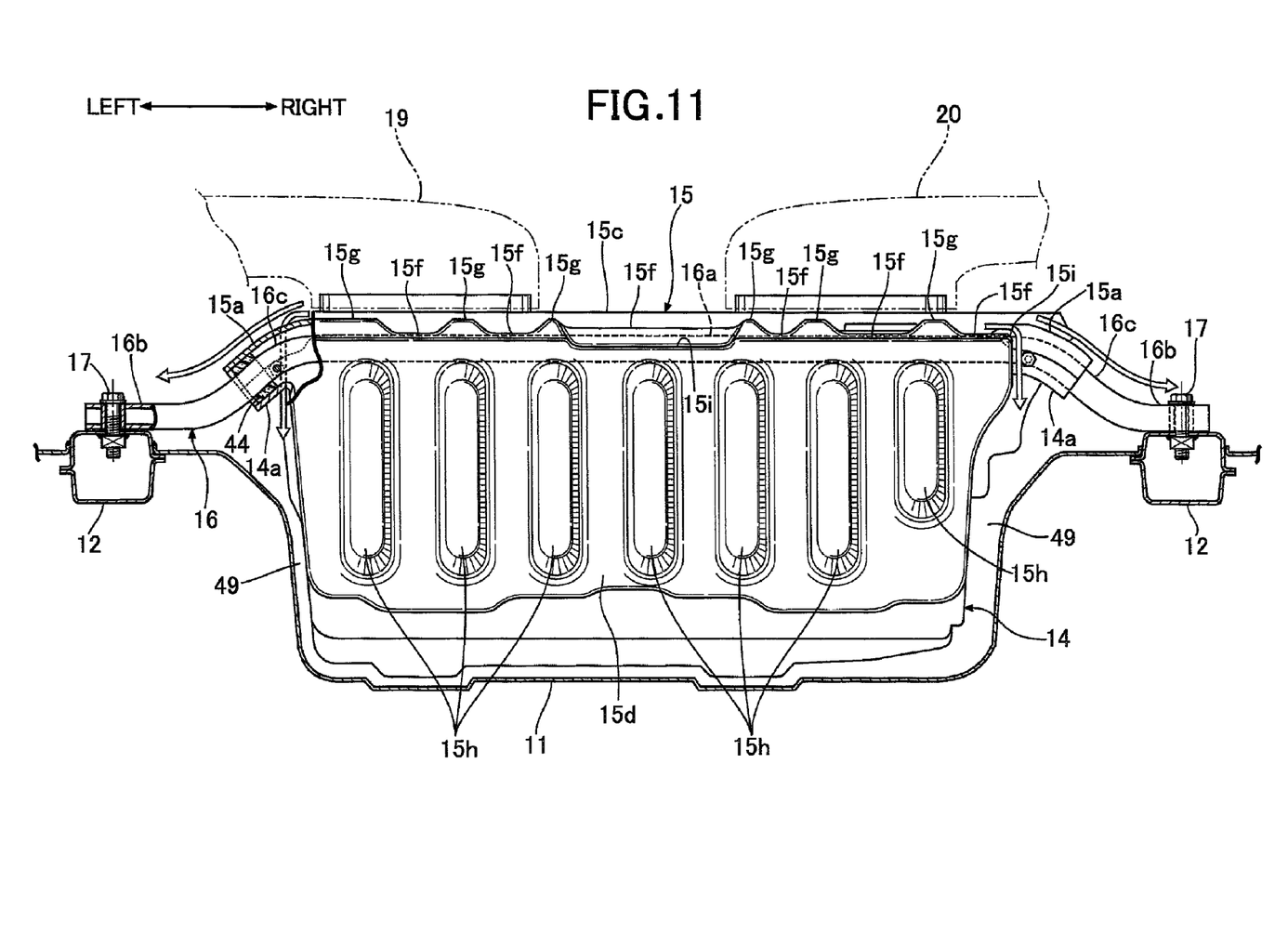
FIG. 11 is a view from arrowed line 11-11 in FIG. 10. (third embodiment)

A third embodiment of the present invention is now explained by reference to FIG. 10 and FIG. 11.

Each of the hanger frames 16 of the first embodiment includes the first horizontal portion 16a in the middle, the second horizontal portions 16b and 16b at opposite ends, and the inclined portions 16c and 16c, which connect the first horizontal portion 16a to the second horizontal portions 16b and 16b and are inclined so that the outer side in the vehicle width direction is higher, but each of hanger frames 16 of the third embodiment includes a first horizontal portion 16a in the middle, second horizontal portions 16b and 16b at opposite ends, and inclined portions 16c and 16c, which connect the first horizontal portion 16a to the second horizontal portions 16b and 16b and are inclined so that the outer side in the vehicle width direction is lower. That is, the inclined portions 16c and 16c of the hanger frame 16 of the third embodiment have a direction of inclination opposite to that of the inclined portions 16c and 16c of the hanger frame 16 of the first embodiment. Accordingly, extended portions 14a and 15a extending from a waterproof case 14 and a lid member 15 so as to cover the inclined portions 16c of each of the hanger frames 16 are also inclined so that the outer side in the vehicle width direction is lower. A lid member 15 is not inclined.

Furthermore, an upper face of the lid member 15 of the waterproof case 14 is equipped with flat portions 15f, which spread out flat over the entire surface thereof, and a plurality of ridge-shaped bead portions 15g are formed on the flat portions 15f so as to extend in a substantially fore-and-aft direction and project upward. A bank-shaped protruding portion 15c is upwardly projectingly provided on the front edge of the lid member 15, and left and right side edges and a rear edge thereof are formed from end edges of the flat portions 15f. A switch box 48 housing a switch and the like projects upwardly from the upper face of the lid member 15. Furthermore, a plurality of bead portions 15h extending vertically and projecting rearwardly are formed on a rear part outside flange 15d hanging downwardly from the rear edge of the lid member 15. These bead portions 15g and 15h enhance the rigidity of the lid member 15.

In accordance with this embodiment, water that has spilled onto the upper face of the lid member 15 of the waterproof case 14 accumulates on the flat portions 15f, which are positioned lower than the bead portions 15g, but since the left and right side edges and the rear edge of the lid member 15, other than the front edge where the protruding portion 15c provided on a duct member 18 side is formed, are formed from the end edges of the flat portions 15f, water that has accumulated on the flat portions 15f flows in the left-and-right direction or rearward due to inertial force acting when the vehicle is accelerated or turned, and is reliably discharged from the upper face of the lid member 15 to a lower part of a tire pan 11, which is formed by recessing part of a floor panel, via a discharge route passing through a space 49 between the waterproof case 14 and the tire pan 11.

Furthermore, the inclined portions 16c of the hanger frames 16 and 16, which project outwardly from mating faces of the waterproof case 14 and the lid member 15, are inclined obliquely downward, and the extended portions 14a and 15a of the waterproof case 14 and the lid member 15 covering the inclined portions 16c are also inclined obliquely downward. Accordingly, water flowing down from the end edges of the flat portions 15f on the upper face of the lid member 15 flows downward along the extended portion 14a and 15a, thus reliably preventing the entrance of water into the interior of the waterproof case 14. Furthermore, since water clinging to the inclined portions 16c and 16c of each of the hanger frames 16 flows toward the outside second horizontal portions 16b and 16b side, which are at a lower position, it does not enter the interior of the waterproof case 14 via the openings of the extended portions 14a and 15a.

Embodiments of the present invention are explained above, but the present invention may be modified in a variety of ways as long as the modifications do not depart from the present invention described in Claims.

For example, in the embodiments a hybrid vehicle is illustrated, but the present invention can also be applied to an electric automobile.

Furthermore, in the first embodiment, the waterproof case 14 includes the downwardly bent inside flange 14c, but this inside flange 14c is not always necessary, and may be omitted.

Moreover, by setting an appropriate gap between the inside flange 14c of the waterproof case 14 and the side part outside flange 15b or the rear part outside flange 15d of the lid member 15, a slit-shaped air layer is formed therebetween, and this air layer can still more reliably prevent the entrance of water into the interior of the waterproof case 14.

Furthermore, the structure of the seal member 44 is not limited to the embodiments either, and a sealing function may be exhibited by abutting an inward lip of a rubber seal member 44, fitted onto and fixed by a band to the outer periphery of each inclined portion 16c of the hanger frame 16, against the outer peripheries of the squared U-shaped cross-section extended portion 14a of the waterproof case 14 and the squared U-shaped cross-section extended portion 15a of the lid member 15.

The invention claimed is:

1. A vehicular power supply system comprising:
    a waterproof case (14) housing at least a battery module (24) or an electrical component (33);
    a lid member (15) covering an upper face opening (14b) of the waterproof case (14); and
    a hanger frame (16) having a longitudinally intermediate section held between the upper face opening (14b) of the waterproof case (14) and an outer peripheral part of the lid member (15) in order to hangingly support the waterproof case (14),
    characterized in that inclined portions (16c) extending obliquely upward or obliquely downward toward the exterior from two mutually opposing side edges of the waterproof case (14) are formed on the hanger frame (16), and
    the upper face opening (14b) of the waterproof case (14) and the outer peripheral part of the lid member (15) are equipped with an extended portion (14a, 15a) extending obliquely upward or obliquely downward along the hanger frame (16) so as to cover the inclined portion (16c) of the hanger frame (16).

2. The vehicular power supply system according to claim 1, wherein the extended portions (14a, 15a) of the waterproof case (14) and the lid member (15) are inclined obliquely upward toward the exterior, and the height of the lower end of the opening of each of the extended portion (14a, 15a) is higher than the height of the upper face of the lid member (15).

3. The vehicular power supply system according to claim 1, wherein a seal member (44) is disposed between the inclined portion (16c) of the hanger frame (16) and the extended portions (14a, 15a) of the waterproof case (14) and the lid member (15).

4. The vehicular power supply system according to claim 1, wherein an outer peripheral part of the lid member (15) is equipped with an outside flange (15b, 15d) bent downwardly in a section other than the extended portion (15a), and the lower end of the outside flange (15b, 15d) is positioned lower than the upper face opening (14b) of the waterproof case (14).

5. The vehicular power supply system according to claim 4, wherein the upper face opening (14b) of the waterproof case (14) is equipped with an inside flange (14c) bent downwardly in a section other than the extended portion (14a), and the lower end of the outside flange (15b, 15d) is positioned lower than the lower end of the inside flange (14c).

6. The vehicular power supply system according to claim 5, wherein the lower end of the outside flange (15b) is equipped with a bent portion (15e) bent toward the waterproof case (14) side.

7. The vehicular power supply system according to claim 1, wherein the lid member (15) is inclined in a direction perpendicular to the orientation of the hanger frame (16), and a protruding portion (15c) is formed along a side on the higher side of the lid member (15).

8. The vehicular power supply system according to claim 7, wherein the waterproof case (14) is disposed in a vehicle body rear part, the upper face of the lid member (15) is inclined so that the vehicle body rear side is lower, and the outside flange (15d), on the vehicle body rear side, of the lid member (15) extends to the vicinity of a lower end part of the waterproof case (14).

9. The vehicular power supply system according to claim 1, wherein the upper face of the lid member (15) includes a flat portion (15f) receiving water, a plurality of bead portions (15g) protruding upwardly from the flat portion (15f), and a protruding portion (15c) that, among outer peripheral edges of the lid member (15), is along the outer peripheral edge on one end side, and a discharge route for discharging water received by the flat portion (15f) is arranged by forming an outlet (15i), which communicates with a space (49) provided between the waterproof case (14) and a floor panel (11), in at least part of the outer peripheral edge, other than a section where the protruding portion (15c) of the lid member (15), in the flat portion (15f) is formed.

* * * * *